US008539340B2

(12) United States Patent
Brayton et al.

(10) Patent No.: US 8,539,340 B2
(45) Date of Patent: Sep. 17, 2013

(54) METHOD TO SERVE REAL-TIME DATA IN EMBEDDED WEB SERVER

(75) Inventors: Robert S. Brayton, Magnolia, TX (US); Jacob P. Frantz, Tomball, TX (US); John R. Carpenter, Katy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1972 days.

(21) Appl. No.: 10/037,683

(22) Filed: Jan. 4, 2002

(65) Prior Publication Data

US 2004/0205564 A1 Oct. 14, 2004

(51) Int. Cl.
*G06F 17/00* (2006.01)
(52) U.S. Cl.
USPC .......................................... 715/240; 715/234
(58) Field of Classification Search
USPC ................... 715/513, 501.1, 500.1, 240, 234;
709/201, 203, 219, 217, 223, 224, 227; 707/1,
707/2; 717/115
See application file for complete search history.

(56) References Cited

U.S. PATENT DOCUMENTS

| | | | | |
|---|---|---|---|---|
| 5,742,768 A * | 4/1998 | Gennaro et al. | ............... | 709/203 |
| 5,790,895 A | 8/1998 | Krontz et al. | ................... | 395/884 |
| 5,835,768 A * | 11/1998 | Miller et al. | ................... | 719/320 |
| 5,898,861 A | 4/1999 | Emerson et al. | ............... | 395/500 |
| 5,956,709 A * | 9/1999 | Xue | .................. | 707/3 |
| 5,983,227 A * | 11/1999 | Nazem et al. | .................... | 707/10 |
| 6,003,078 A * | 12/1999 | Kodimer et al. | .............. | 709/224 |
| 6,021,437 A * | 2/2000 | Chen et al. | ..................... | 709/224 |
| 6,301,590 B1 * | 10/2001 | Siow et al. | ..................... | 715/234 |
| 6,385,592 B1 * | 5/2002 | Angles et al. | .................... | 705/14 |
| 6,397,245 B1 * | 5/2002 | Johnson et al. | ............... | 709/203 |
| 6,477,667 B1 * | 11/2002 | Levi et al. | ........................ | 714/57 |
| 6,487,547 B1 * | 11/2002 | Ellison et al. | ..................... | 707/2 |
| 6,622,168 B1 * | 9/2003 | Datta | ............................ | 709/219 |
| 6,718,515 B1 * | 4/2004 | Conner et al. | ................. | 715/509 |
| 6,732,330 B1 * | 5/2004 | Claussen et al. | ............... | 715/513 |
| 6,823,319 B1 * | 11/2004 | Lynch et al. | ..................... | 705/38 |
| 6,823,359 B1 * | 11/2004 | Heidingsfeld et al. | ........ | 709/203 |
| 6,826,594 B1 * | 11/2004 | Pettersen | ...................... | 709/203 |
| 6,865,716 B1 * | 3/2005 | Thurston | ....................... | 715/536 |
| 6,952,737 B1 * | 10/2005 | Coates et al. | ................. | 709/229 |
| 6,973,490 B1 * | 12/2005 | Robertson et al. | ............ | 709/224 |
| 7,000,008 B2 * | 2/2006 | Bautista-Lloyd et al. | .... | 709/219 |
| 7,437,660 B1 * | 10/2008 | Mehta et al. | ................... | 715/205 |
| 2002/0032706 A1 * | 3/2002 | Perla et al. | ..................... | 707/530 |
| 2002/0069204 A1 * | 6/2002 | Kahn et al. | ....................... | 707/10 |
| 2002/0169851 A1 * | 11/2002 | Weathersby et al. | ......... | 709/218 |
| 2003/0050995 A1 * | 3/2003 | Mateos | ........................... | 709/217 |
| 2003/0135819 A1 * | 7/2003 | Lakhdhir et al. | .............. | 715/500 |

OTHER PUBLICATIONS

Emerson et al., "Operating System Independent Method and Apparatus for Graphical Remote Access," U.S. Appl. No. 09/438,253, filed Nov. 12, 1999.
Frantz et al., "USB Virtual Devices," U.S. Appl. No. 09/544,573, filed Apr. 6, 2000.

(Continued)

*Primary Examiner* — Adam M Queler

(57) ABSTRACT

The present technique serves Web pages that are mixed with dynamic data from an embedded system using object files to access the dynamic data. The technique constructs the object files in the embedded system in real-time separate from the Web pages. The technique then merges the dynamic data with the Web pages and displays the data-populated Web pages via a Web browser. The data/page merging process may be performed at either the server side or the client side.

19 Claims, 5 Drawing Sheets

(56) References Cited

OTHER PUBLICATIONS

Emerson et al., "Video Eavesdropping and Reverse Assembly to Transmit Video Action to a Remote Console," U.S. Appl. No. 08/733,254, filed Oct. 18, 1996.

"Compaq Remote System Management for Industry-Standard Servers," Compaq Computer Corporation Technology Brief, Sep. 2001.

"Remote Server Management with Integrated Remote Console," Compaq Computer Corporation Technology Brief, Oct. 21, 1996.

* cited by examiner

METHOD TO SERVE REAL-TIME DATA IN EMBEDDED WEB SERVER

BACKGROUND OF THE INVENTION

1. Field of the Invention

The present technique relates generally to network computer systems, such as client/server computer systems. More particularly, a technique is provided for serving real-time data using a Web browser in an embedded environment.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A variety of Web browsers, such as Netscape, Internet Explorer and America Online, are currently available for browsing the Internet and accessing resources across computer networks. The current standard for displaying information in these Web browsers is the hypertext markup language (HTML). Web pages using the HTML format typically have limited formatting capabilities and functionality. For example, special tags must be used to format text, to create objects such as tables, to insert pictures, to create background colors and schemes, to represent data, and to provide various other features for the Web pages.

In certain applications, it is desirable to provide real-time data on the Web pages. The conventional technique for providing such data is to slipstream the data into hard-coded Web pages or to parse special tokens into the HTML pages and then replace the tokens with the real-time data. Not only do these techniques consume considerable processor resources, they complicate Web page development, because the data generation process integrally relates to the Web page development process. Accordingly, the Web page developer must understand both the data generation process and Web page development. Existing techniques also prevent effective offline Web page development, because of this integral relationship between the data and the Web pages. Unfortunately, HTML does not have a standard for serving real-time data from an embedded environment, which generally refers to an environment where an object or data generated by one application is embedded into an object or document generated by another application.

The present technique addresses the foregoing problems by serving Web pages that are mixed with dynamic data from an embedded system using object files to access the dynamic data. Accordingly, the present technique separates the development of Web pages from that of the dynamic data, thereby improving the efficiency of each development process.

BRIEF DESCRIPTION OF THE DRAWINGS

Certain advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique serves Web pages that are mixed with dynamic data from an embedded system using object files to access the dynamic data. The technique constructs the object files in the embedded system in real-time separate from the Web pages. The technique then merges the dynamic data with the Web pages and displays the data-populated Web pages via a Web browser. The data/page merging process may be performed at either the server side or the client side.

As described in detail below, present technique serves Web pages that are mixed with dynamic or ephemeral data from an embedded system using object files to access the dynamic or ephemeral data. The Web pages embody a file system object linked to files and dynamic data via embedded controller code, which has facilities to find and serve the files and dynamic data to the file system object. In operation, the present technique constructs the object or data files in real-time in the embedded system and then transmits these files to the requesting computer system. The real-time data is then merged and displayed by the client browser using standard statements for the object files, such as standard JavaScript or VBScript statements. The real-time data also may be merged at the server side rather than by the client browser. In either case, the present technique separates the development of the Web pages from that of the dynamic data in the embedded system.

Figure 1:
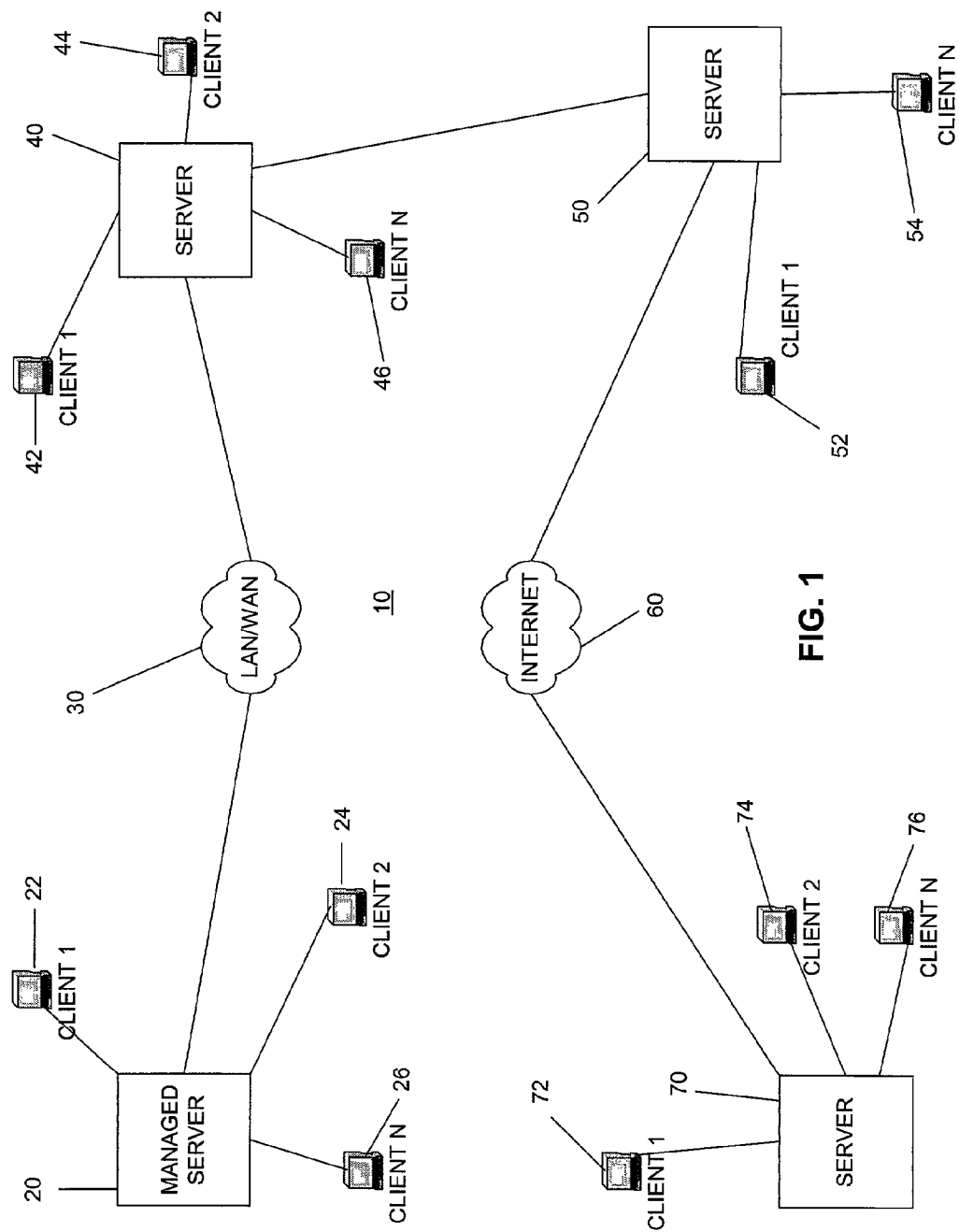
FIG. 1 is a block diagram illustrating an exemplary network of the present technique.

Turning now to the drawings and referring initially to FIG. 1, a block diagram of an exemplary computer network system in which the present invention may be practiced is illustrated and designated using reference numeral 10. The computer network 10 is intended to illustrate a typical modem computer network configuration with all its complexities and flexibility. A managed server 20 is connected to a plurality of client computers 22, 24 and 26. For purposes of explaining the present embodiment clearly, only one server on the network 10 has been designated as a "managed server." In practice, those of skill in the art will appreciate that any or all of the servers in the network 10 could simultaneously include hardware and software devised according to the invention, making those servers "managed servers".

The managed server 20 may be connected to as many as n different client computers. The magnitude of n is a function of the computing power of the managed server 20. If the managed server has large computing power (for example, faster processor(s) and/or more system memory) relative to other servers on the network, it will be able to serve a relatively large number of client computers effectively.

The managed server 20 is connected via a typical network infrastructure 30, which may include any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Figure 2:
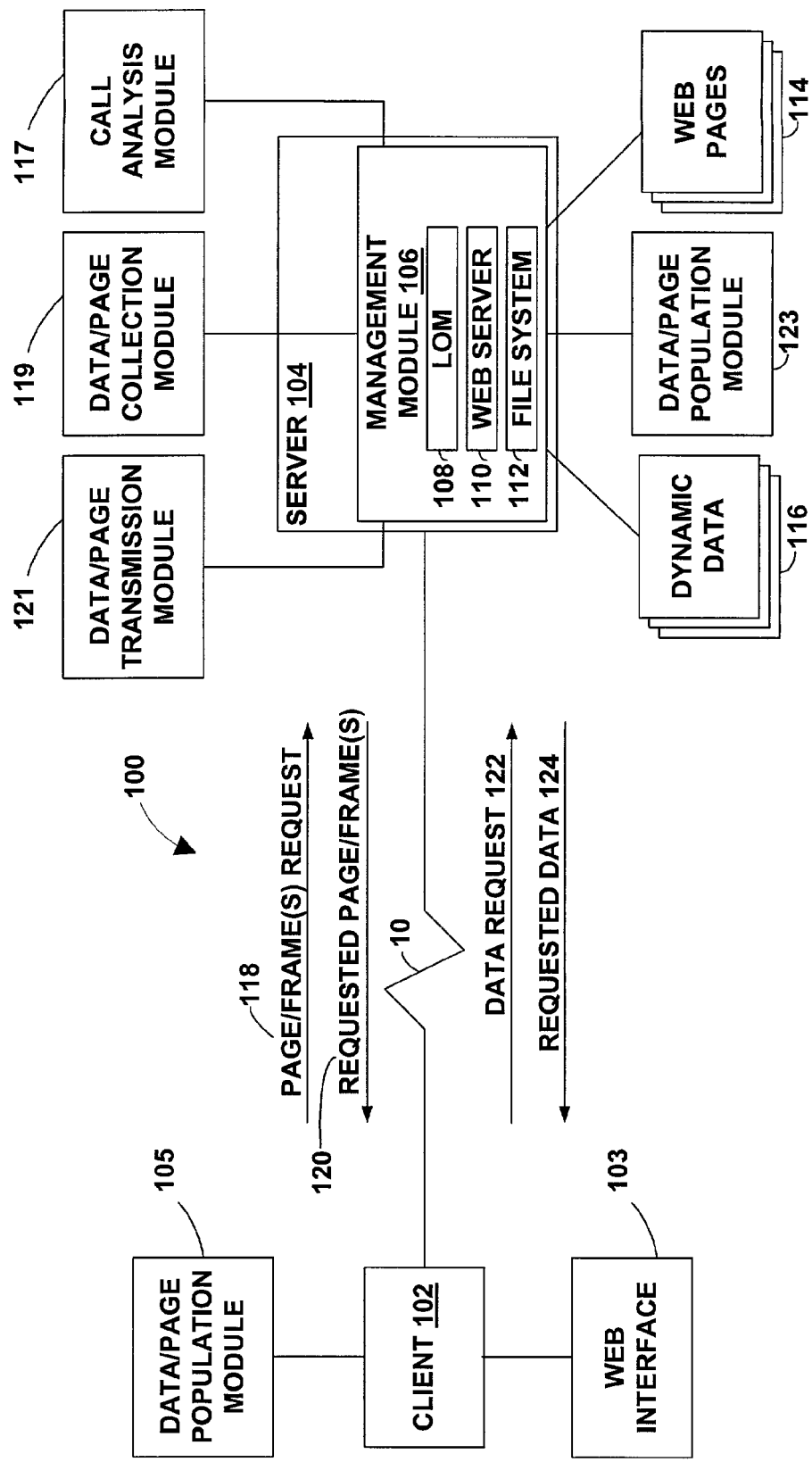
FIG. 2 is a block diagram illustrating an exemplary dynamic data server system of the present technique.

FIG. 2 is a block diagram illustrating an exemplary dynamic data server system 100 of the present technique. As illustrated, a client 102 and a server 104 are communicatively coupled via the network 10. In this exemplary embodiment, the client 102 has a Web interface 103 (e.g., a Web browser) for retrieving, processing, and displaying Web pages. The server 104 comprises a management module 106 having a "lights out" management module (LOM) 108, a Web server 110, and a file system 112. The management module 106 also may comprise any other suitable components for managing network resources, such as client computer systems, headless servers, Web pages, and other hardware and software resources. The lights out management module 108 is provided for managing a headless computer system, which generally represents a computer lacking user interaction devices, such as a monitor, a keyboard, and a mouse. The system 100 serves dynamic data, or real-time data, to the client 102 by providing Web pages 114 with objects, such as JavaScript or VBScript objects, linkable to dynamic data 116.

The Web pages 114 may have a variety of JavaScript or VBScript functions for merging the Web pages 114 with the dynamic data 116. For example, one of the Web pages 114 (e.g., MyDocument.htm) may comprise the following code:

```
<html>
<head>
<script src= "JSFunct.js"></script>
<script src= "dataTable.js"></script>
<head/>
<body>
My data is: <script>printValue( myData )</script><br>
Here is my table:<br>
<table>
<script>stringTable( myTable )</script>
</table>
</body>
</html>
```

The objects "JSFunct.js" and "dataTable.js" are JavaScript functions, which are used to transfer, format, and merge the dynamic data 116 with the Web pages 114. In this example, the foregoing JavaScript functions may comprise the following code and data:

```
JSFunct.js

Function printValue(value)
{
    Document.write(value);
}
Function stringTable(stringArray)
{
    For (stringLine in stringArray)
        Document.write("<tr><td>" +stringLine+ "</td></tr>")
}
```

```
dataTable.js myData= "32";
myTable= ["Line 1", "Line 2", "Line 3"]
```

Accordingly, the foregoing "MyDocument.htm" Web page would initially have the text "My data is:" and "Here is my table" without any corresponding data. However, at the server side or at the client side, the dynamic data server system 100 merges the JavaScript object "dataTable.js" with the Web page "MyDocument.htm" according to the JavaScript defined in the Web page and defined by the foregoing JavaScript functions. As described in detail below, any suitable object file or code, such as JavaScript or VBScript, may be utilized to provide data within the scope of the present technique. Accordingly, the present technique may dynamically fill tables, drop-down menus, list boxes, text boxes, and various other objects within the Web pages 114.

As illustrated in FIG. 2, the client 102 may initiate operation of the dynamic data server system 100 by browsing the network 10 and requesting a desired Web page 118, which may comprise one or more frames. The page/frame(s) request 118 is transmitted from the client 102, through the network 10, and to the server 104. The server 104 then processes the request 118, retrieves the appropriate Web page from the Web pages 114, and returns the requested page/frame(s) 120 to the client 102. For example, the server 104 or the management module 106 may include a call analysis module 117 to evaluate the page/frame(s) request 118, a data/page collection module 119 to collect the proper page/frame(s) for the request 118, and a data/page transmission module 121 to return the requested page/frame(s) 120 to the client 102. In the illustrated embodiment, the system 100 transmits the requested page 120 to the client 102 separate from the corresponding dynamic data 116 for that page.

Upon receipt of the requested page 120, the client 102 evaluates the objects/code within the page 120 (e.g., JavaScript functions) and transmits a data request 122 for the desired objects to the server 104, which searches the file system 112 for the appropriate objects and populates those objects with the dynamic data 116. For example, the Web interface 103 may evaluate the markup language and script language within the retrieved page 120, and identify one or more files, objects, or general data needed for complete display of the Web page. The server 104 then transmits the requested data 124 to the client 102 as populated objects (e.g., JavaScript functions or arrays of data), which are then merged with the objects (e.g., tables, menus, text, etc.) in the requested page 120. For example, the client 102 may have a data/page population module 105 to insert the retrieved data in the proper location within the Web page. In an exemplary embodiment, the Web interface 103 may comprise scripts (e.g., JavaScript or VBScript functions or commands) to populate the Web page with the retrieved data files. Alternatively, as mentioned above, the process 100 can merge the dynamic data 116 with the Web pages 114 in response to the initial request 118 for the desired page/frame(s). For example, at the server 104, the process 100 may use a data/page population module 123 to populate the Web page with the dynamic data gathered by the collection module 119 from the dynamic data 116. The process 100 may then transmit the data populated Web page to the client 102 via the transmission module 121. In either case, the page/frame(s) displayed at the client 102 comprises one or more of the Web pages 114 merged with desired portions of the dynamic data 116.

Figure 3:
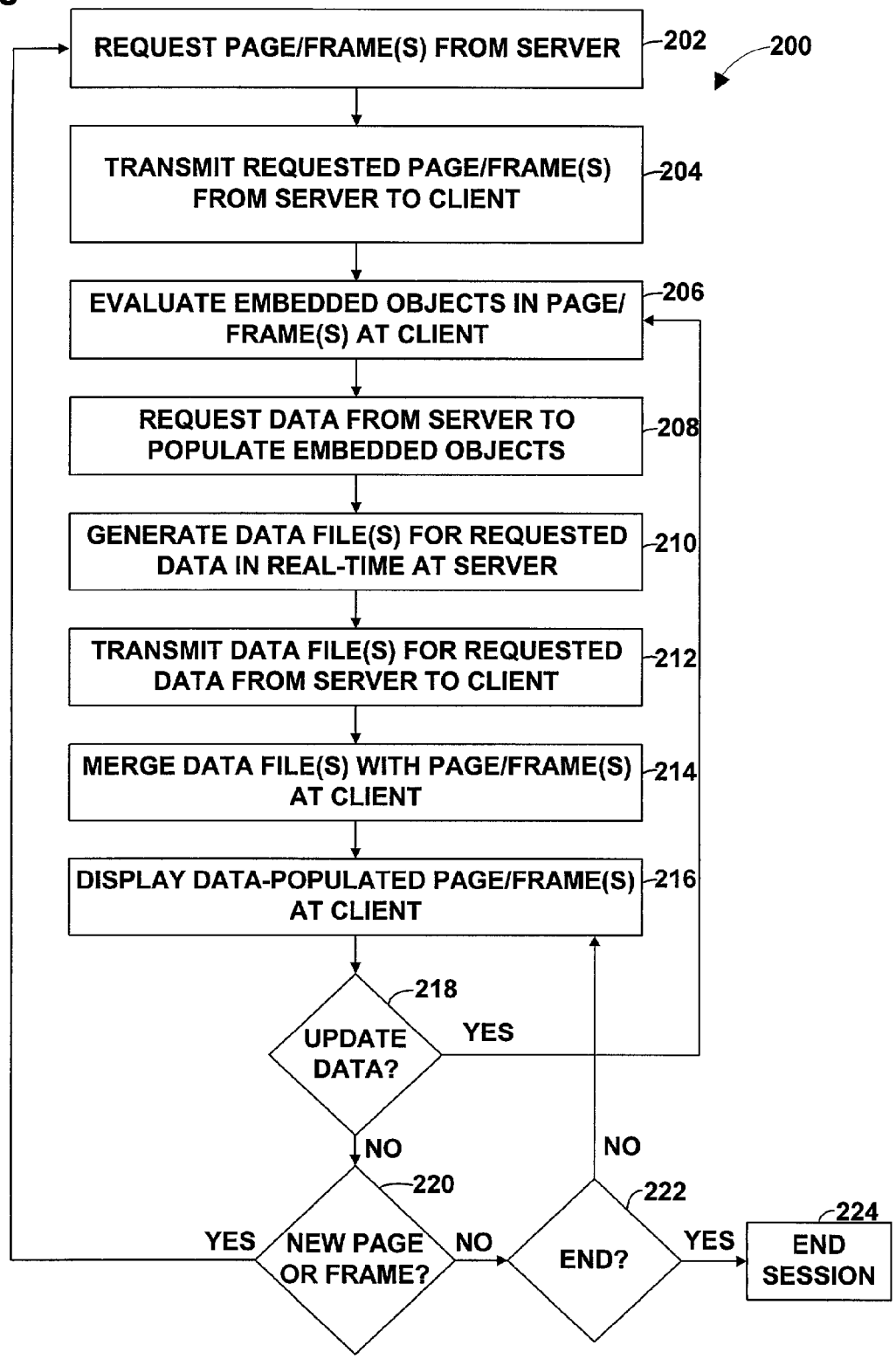
FIG. 3 is a flow chart illustrating an exemplary dynamic data server process in which dynamic data is merged with a Web page at the client side.

FIG. 3 is a flow chart illustrating an exemplary dynamic data server process 200 of the present technique. As illustrated, the process 200 proceeds by requesting a page or frame(s) from the server (block 202). The server receives this request via the network 10, processes the request, searches the file system 112 for the requested page or frame(s), retrieves the appropriate page or frame(s), and transmits requested page or frame(s) from the server 104 to the client 102 (block 204).

In this exemplary embodiment, the process 200 then proceeds to evaluate the embedded objects or functions within the page or frame(s) (block 206). As described above, these embedded objects may comprise links to a variety of JavaScript functions, JavaScript arrays, or various other JavaScript or VBScript type objects. These embedded objects are typically enclosed by script tags and are identified by the source tag "src=file.js," where file.js is the JavaScript file or function having the desired dynamic data or code. Accordingly, the process 200 (e.g., the Web browser) searches the retrieved page or frame(s) for the foregoing identifiers and requests data from the server to populate the embedded objects (block 208).

The server 104 receives the data request corresponding to the embedded objects, searches the file system 112 for the appropriate dynamic data, and generates data files for the requested data in real-time at the server 104 (block 210). For example, the data files may comprise JavaScript functions, variables, arrays, and various other objects for transferring and formatting the dynamic or ephemeral data. The process 200 then proceeds to transmit the generated data files from the server 104 to the client 102 via the network 10 (block 212). At the client side, the process 200 (e.g., the Web browser) merges these data files with the page or frame(s) previously retrieved from the server 104 (block 214). The data files generated and transmitted from the server 104 also may be hidden from the user at the client 102, where these data files are temporarily stored in the browser cache during the page/data merging process. For example, the Web browser may merge the unpopulated page or frame(s) with one or more variables or arrays of data for a table, a drop-down menu, a list box, or any other desired application or objected-oriented feature within the page or frame(s). The process 200 (e.g., the Web browser) then proceeds to display the data populated page or frame(s) at the client 102 (block 216). If the user browses to another Web page, then the foregoing data files may be eliminated from the browser cache.

The foregoing process 200 continues to operate as the client browses through Web pages and requests updated data for any one of those Web pages. For example, the client 102 may request updated real-time data by clicking the refresh button on the Web browser (block 218). If the client 102 desires updated data, then the process 200 may return to block 206 for evaluation of the embedded objects within the current page or frame(s). However, if the client 102 does not desire updated data for the current page or frame(s), then the process 200 may proceed to query whether the client 102 desires a new page or frame (block 220). If the client 102 desires a new page or frame, then the process 200 may return to block 202 to initiate a new server request for the desired page or frame(s). However, if the client 102 does not desire a new page or frame(s), then the process 200 may query whether the client desires to end the current session (block 222). If the client does not desire to end the current session, then the process 200 continues to display the data populated page or frame(s) at the client 102 (block 216). Otherwise, the process 200 proceeds to end the current session (block 224).

Figure 4:
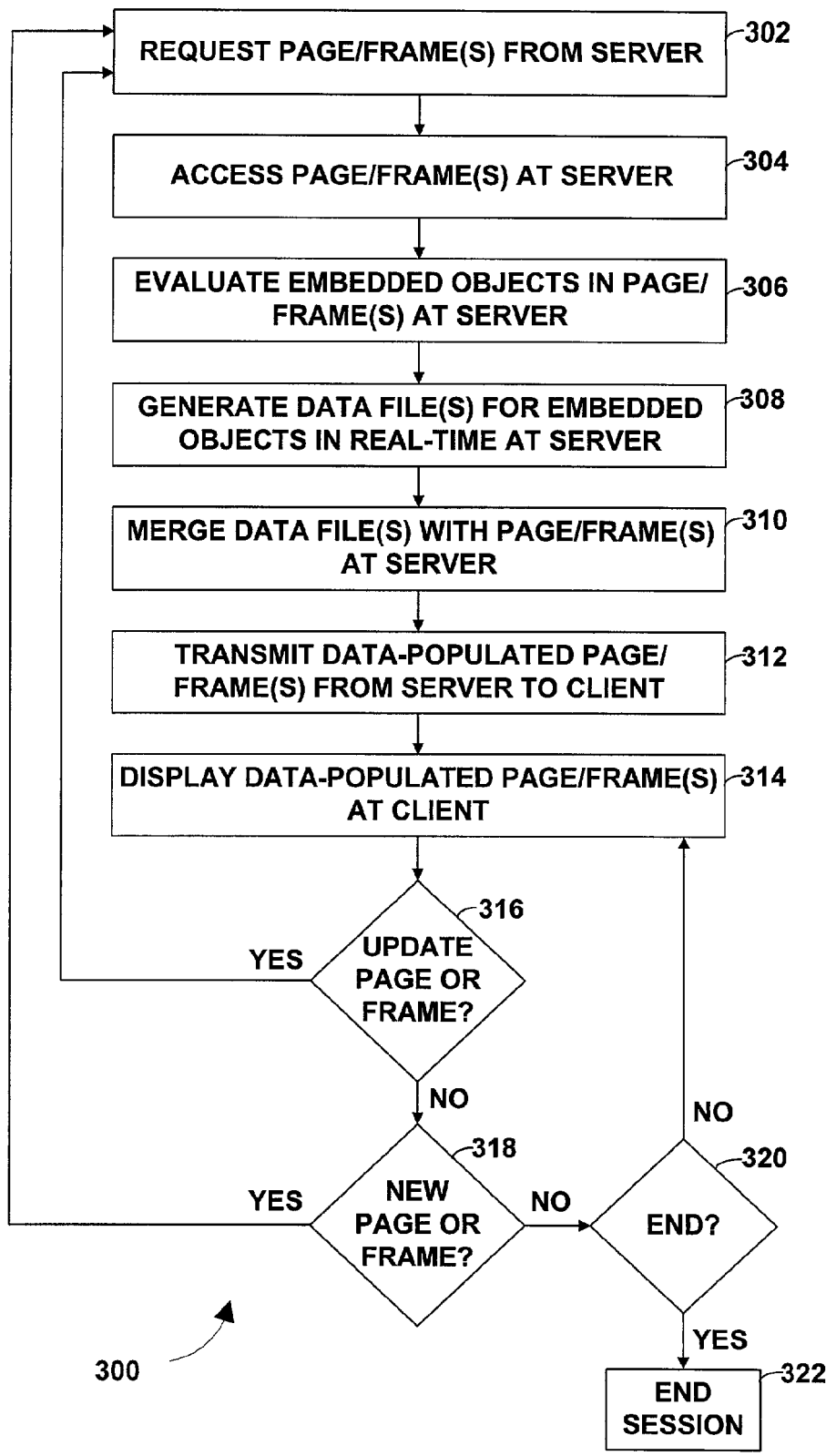
FIG. 4 is a flow chart illustrating an exemplary dynamic data server process in which dynamic data is merged with a Web page at the server side.

As mentioned above, the present technique also can merge Web pages with dynamic data at the server 104 rather than at the client 102. FIG. 4 is a flow chart illustrating an exemplary dynamic data server process 300 of the present technique. The process 300 begins as the client 102 requests a page or frame(s) from the server 104 (block 302). The process 300 transmits this client request across the network 10 to the server 104, which then searches and accesses the appropriate page or frame(s) disposed in the file system 112 of the server 104 (block 304).

In this exemplary embodiment, the process 300 then proceeds to evaluate the embedded objects in the page or frame(s) at the server 104 (block 306). The desired functions, variables, and data files may be identified by the source tags "src=file.js" or any other suitable identifiers, such as the actual file names for the data or functions. The process 300 then searches the server file system 112 for the appropriate data and generates the desired data files for the embedded objects in real-time at the server 104 (block 308). The foregoing real-time data files are then merged with the requested page or frame(s) at the server 104 (block 310), which transmits the data populated page or frame(s) from the server 104 to the client 102 (block 312). Thus, in this embodiment, the client 102 displays the data populated page or frame(s) without separate data retrieval from the server 104 (block 314). For example, the server populates the Web page with the actual dynamic data for every scripting call <script src="file.js"></script> (e.g., 32 for myData), while the client Web browser performs the actual display of the dynamic data via the scripting write command <script>document.write (myData)</script>.

The foregoing process 300 continues to operate as the client browses through Web pages and requests updated data for any one of those Web pages. For example, the client 102 may request updated real-time data by clicking the refresh button on the Web browser (block 316). If the client 102 desires a page or frame update, then the process 300 may return to block 302 for a new request for the page or frame(s) from the server 104. Alternatively, the process 300 may proceed to block 206 of FIG. 3, evaluate the embedded objects, retrieve desired dynamic data from the server 104, and merge the retrieved data and the Web page at the client 102. However, if the client 102 does not desire updated data for the current page or frame(s), then the process 300 may proceed to query whether the client 102 desires a new page or frame (block 318). If the client 102 desires a new page or frame, then the process 300 may return to block 302 for a new request for the new page or frame(s) from the server 104. However, if the client 102 does not desire a new page or frame(s), then the process 300 may query whether the client wishes to end the current session (block 320). If the client does not wish to end the current session, then the process 300 continues to display the data populated page or frame(s) at the client 102 (block 314). Otherwise, the process 300 proceeds to end the current session (block 322).

Figure 5:
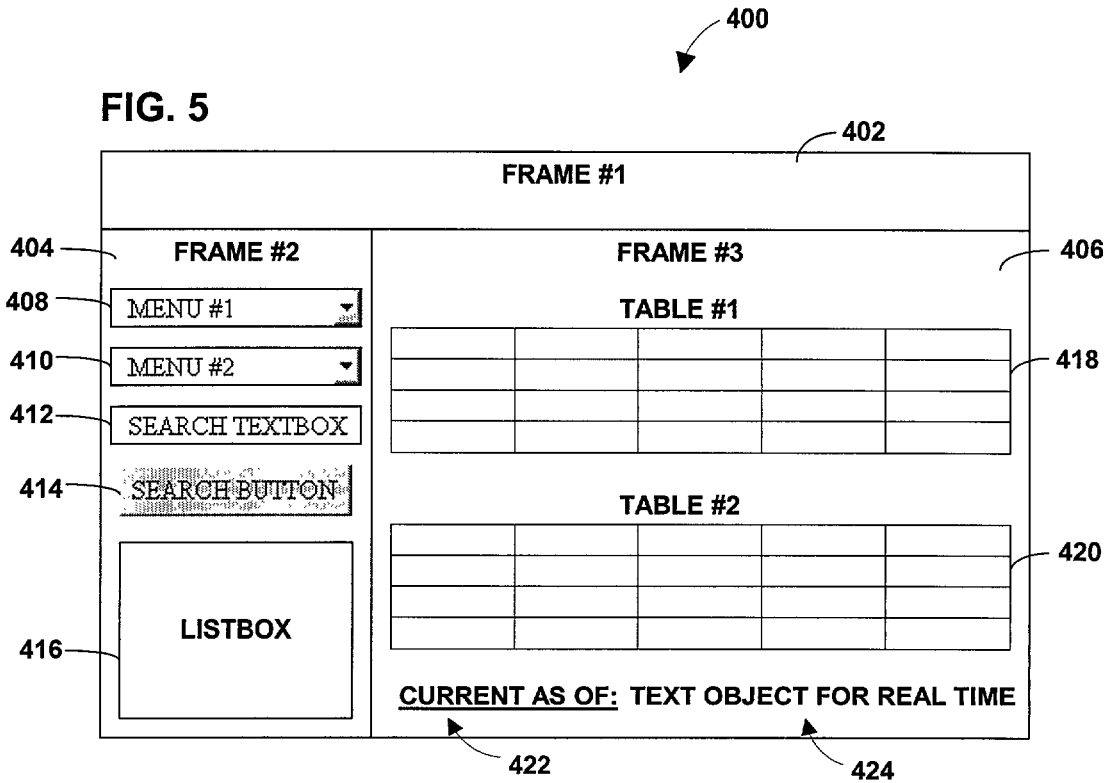
FIG. 5 is an exemplary unpopulated Web page having objects configured for population by dynamic data.
Figure 6:
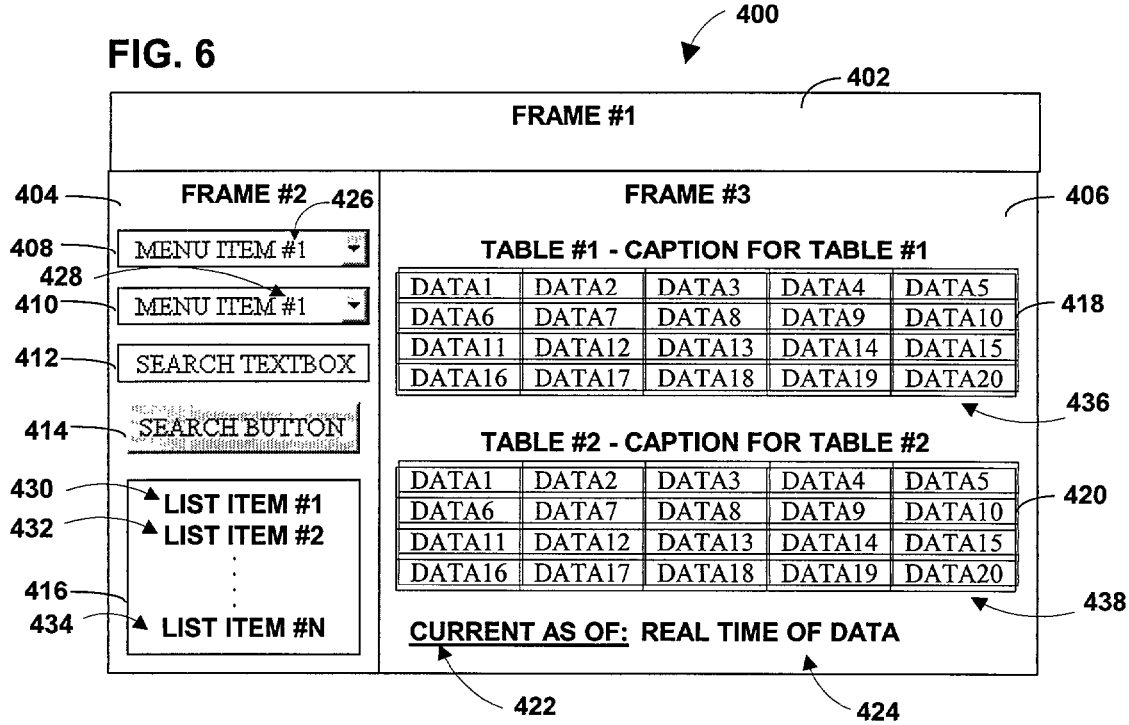
FIG. 6 is an exemplary populated Web page having real-time data from an embedded system.

FIGS. 5 and 6 are exemplary unpopulated and populated Web pages of the present technique. As illustrated, the foregoing system 100 and processes 200 and 300 may be used to populate various objects within a Web page 400. The illustrated Web page 400 comprises a plurality of frames, tables, drop-down menus, list boxes, buttons, and various other features. For example, the Web page 400 comprises frames #1, #2, and #3, which are indicated by reference numerals 402, 404, and 406, respectively. Frame 404 comprises a drop-down menu 408, a drop-down menu 410, a search text box 412, a search button 414, and a listbox 416. Frame 406 comprises tables #1 and #2, which are indicated by reference numerals 418 and 420, respectively. Each of these tables 418 and 420 have a plurality of rows and columns for the desired data. Frame 406 also comprises text 422, which refers to a text object 424 for the real-time of the dynamic data being merged with the Web page 400. For example, the text object 424 may embody a simple JavaScript function for retrieving the current time as dynamic data is gathered at the server 104.

FIG. 6 illustrates the Web page 400 after operation of the foregoing dynamic data server systems and processes. As illustrated, dynamic data has been merged with the Web page 400 to fill the drop-down menus 408 and 410, the listbox 416, and the tables 418 and 420. The drop-down menus 408 and 410 now have a plurality of menu items, such as menu items 426 and 428, respectively. The list box 416 also has a plurality of list items, such as list items 430, 432, and 434. Similarly, each of the tables 418 and 420 has a plurality of dynamic data in the rows and columns of the respective tables. For example, table 418 has been populated with data 436, while table 420 has been populated with data 438.

As described above, the present technique advantageously separates the development of Web pages from that of the dynamic data, and provides an efficient technique for populating Web pages with real-time data at the client or server side of the network 10. Any suitable browser and programming language, such as JavaScript and VBScript, may be used within the scope of the present technique. The Web pages do not have to reside in the embedded controller to access the dynamic data, nor is there any need for special tags (e.g., ASP tags) to represent the data. Accordingly, Web developers are able to change, develop, and test new Web pages for embedded environments quickly and easily. Moreover, Web page development can proceed in parallel with dynamic data service development. The Web developer does not need to understand the data generation process, nor does the dynamic data developer need to understand the Web page development process.

The present technique also has various other advantageous features. For example, the present technique may provide language files in the file system to facilitate language localization. These language files may facilitate language localization without changes to firmware code. The foregoing dynamic data server systems and processes are also useful for special applications, such as handheld or palmtop computing platforms. Additionally, the present technique is operable in standard encrypted Internet security systems and across firewalls. The server 104 that serves the dynamic data is also capable of processing Common Gateway Interface (CGI) requests. The present technique also may use file attribute flags and file time stamps in the Web page development host environment for attribute flags required by the embedded system.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the Web pages may be written in any suitable Web format or markup language, such as the Hypertext Markup Language (HTML), the Extensible Markup Language (XML), the Voice Extensible Markup Language (VXML), the Extensible Hypertext Markup Language (XHTML), the compact HTML (cHTML), the electronic business Extensible Markup Language (ebXML), the Standard Generalized Markup Language (SGML), the Electronic Commerce Modeling Language (ECML), the Extensible Style Language (XSL), or the ColdFusion Markup Language (CFML). Moreover, the present technique populates the foregoing Web pages with dynamic or ephemeral data using any suitable data calls, functions, variables, object-oriented languages, macros, batch files, cookies, dynamic and streaming methodologies (e.g., Dynamic HTML), or scripting languages. For example, the object or data files may comprise JavaScript functions and objects, Visual Basic functions and objects, and various other functional or data formats. Other languages that may be used by the present technique include the HyperCard or AppleScript languages, the Jscript language, the VBScript language, the ECMA Script language, ActiveX controls, BASIC, C, C++, COBOL, FORTRAN, or any other suitable scripting or objected oriented language. The present technique also may use the Common Gateway Interface (CGI) for processing the dynamic or ephemeral data on the server-side.

What is claimed is:

1. A method of serving data from a management module of a managed server, comprising:
    serving a web page to a requesting computer from the managed server, the web page comprising a source call to an object file and code including scripting functions defined by the object file, wherein the requesting computer is remote from the managed server, and wherein at least one of the scripting functions is for merging data associated with the object file with the web page;
    receiving a request from the requesting computer at the managed server for the object file, wherein the request is received after the web page has been served to the requesting computer and after the requesting computer has evaluated the at least one scripting function;
    populating the object file in real-time with data from the management module of the managed server after both serving the web page and receiving the request for the object file; and
    serving the object file to the requesting computer after populating the object file.

2. The method of claim 1, wherein populating the object file comprises populating the object file with a scripting function.

3. The method of claim 2, wherein the scripting function populated in the object file is a JavaScript function.

4. The method of claim 1, wherein populating the object file comprises populating the object file with an array of data.

5. The method of claim 1, wherein populating the object file comprises acquiring real-time data indicative of a current status of a server.

6. The method of claim 1, wherein populating the object file comprises providing a language localization file.

7. The method of claim 1, wherein serving the web page comprises serving the web page configured for a handheld or palmtop computing platform.

8. The method of claim 1, wherein serving the web page comprises serving the web page across a firewall.

9. A method of displaying a web page, comprising:
  requesting at least a frame of a web page from a managed server, wherein the frame comprises a first embedded object and a call to a scripting language function defined by the first embedded object, wherein the scripting language function is for merging data corresponding to the first embedded object with the web page;
  receiving the frame from the managed server;
  based on evaluating the scripting language function, requesting, by a requesting computer, the data corresponding to the first embedded object from the managed server after receiving the frame from the managed server;
  receiving, by the requesting computer, the data corresponding to the first embedded object;
  calling, by the requesting computer, the scripting language function defined by the first embedded object; and
  merging, by the requesting computer, the data corresponding to the first embedded object into the frame.

10. The method of claim 9, further comprising displaying the frame.

11. The method of claim 9, further comprising evaluating the frame to identify a source tag of the first embedded object.

12. The method of claim 9, wherein the data corresponding to the first embedded object comprises dynamic data from a management module of the managed server.

13. The method of claim 12, wherein the dynamic data is generated in real-time in response to the request for the data corresponding to the first embedded object.

14. The method of claim 9, wherein the data corresponding to the first embedded object comprises a scripting language function.

15. The method of claim 14, wherein the frame comprises a second embedded object linked to dynamic data in the managed server, and wherein the scripting language function is configured to merge the dynamic data with the frame.

16. The method of claim 9, wherein the data corresponding to the first embedded object comprises a current time and dynamic data gathered at the managed server at the current time.

17. The method of claim 9, wherein merging the data comprises populating a drop-down menu with menu items.

18. A server, comprising:
  a management module configured to generate dynamic data; and
  a file system configured to store a web page that has both a first embedded object configured to access the dynamic data and a second embedded object configured to merge the dynamic data with the web page, wherein the first embedded object is executable on a client remote from the server to request the dynamic data from the server, and wherein the web page includes a scripting language function defined by the second embedded object, the scripting language function for merging the dynamic data with the web page;
  wherein the server is configured to further:
    send, to the client, the web page that has the first embedded object, the second embedded object, and the scripting language function defined by the second embedded object;
    after sending the web page, receive a request from the client that is based on evaluating the scripting language function of the web page at the client;
    in response to the request, retrieve the dynamic data and send the retrieved dynamic data to the client for merging with the web page.

19. The server of claim 18, wherein the second embedded object is executable on the client remote from the server to merge the dynamic data with the web page.

* * * * *